United States Patent
Manian et al.

(10) Patent No.: US 9,762,292 B2
(45) Date of Patent: Sep. 12, 2017

(54) POWER HARVEST ARCHITECTURE FOR NEAR FIELD COMMUNICATION DEVICES

(71) Applicant: Texas Instruments Incorporated, Dallas, TX (US)

(72) Inventors: Srikanth Manian, Chennai (IN); Yogesh Darwhekar, Bangalore (IN); Abhishek Agrawal, Bangalore (IN); Koby Levy, Bat-Yam (IL); Yaniv Tzoreff, Jerusalem (IL); Erez Shalom, Givataim (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 969 days.

(21) Appl. No.: 14/040,275

(22) Filed: Sep. 27, 2013

(65) Prior Publication Data

US 2015/0091385 A1    Apr. 2, 2015

(51) Int. Cl.
    *H04B 5/00*    (2006.01)
(52) U.S. Cl.
    CPC .................................. *H04B 5/0037* (2013.01)
(58) Field of Classification Search
    CPC .............................. H02J 5/005; H04B 5/0037
    See application file for complete search history.

(56) References Cited

U.S. PATENT DOCUMENTS

| | | | |
|---|---|---|---|
| 6,906,531 B2* | 6/2005 | Mobley | H04L 25/063 324/613 |
| 7,635,925 B2* | 12/2009 | Frew | G06F 1/263 307/52 |
| 7,911,820 B2* | 3/2011 | Anand | G11C 17/16 365/189.16 |
| 7,975,921 B2* | 7/2011 | Mani | G06K 7/0008 235/441 |
| 8,665,006 B2* | 3/2014 | Scilla | H01C 17/22 327/525 |
| 8,824,597 B2* | 9/2014 | Darwhekar | G06K 19/0701 327/50 |
| 9,124,413 B2* | 9/2015 | Savoj | H03L 7/0891 |
| 2002/0105452 A1* | 8/2002 | Clapp | G01R 31/31924 341/144 |

(Continued)

OTHER PUBLICATIONS

Robert J. Widlar, "New development in IC voltage regulator" IEEE Journal of solid state circuits, vol. sc-6, Feb. 1971.*

*Primary Examiner* — Thienvu Tran
*Assistant Examiner* — Pinping Sun
(74) *Attorney, Agent, or Firm* — John R. Pessetto; Charles A. Brill; Frank D. Cimino (57) ABSTRACT

A method of charging a power harvested supply in an electronic communication device, which can be an NFC (near field communication) device. The power harvested supply in the electronic communication device is charged without causing dV/V violation and avoids false wake up. An RF (radio frequency) field is received at the antenna of the electronic communication device. A differential voltage is generated from the RF field at a first tag pin and a second tag pin of the electronic communication device. A bandgap reference voltage and a reference current are generated in response to the differential voltage. A shunt current is generated in response to the differential voltage and the bandgap reference voltage. A bank of switching devices is activated if the shunt current is more than the reference current.

20 Claims, 4 Drawing Sheets

(56) References Cited

U.S. PATENT DOCUMENTS

| | | | |
|---|---|---|---|
| 2010/0291871 A1* | 11/2010 | Butler | G06K 19/0701 455/41.1 |
| 2011/0300798 A1* | 12/2011 | Lefley | H02J 17/00 455/41.1 |
| 2011/0300799 A1* | 12/2011 | Da Fonseca | H04B 5/0075 455/41.1 |
| 2011/0300808 A1* | 12/2011 | Rokhsaz | H03J 3/20 455/67.11 |
| 2012/0313592 A1* | 12/2012 | Ochoa | G06K 19/0715 323/223 |
| 2013/0113276 A1* | 5/2013 | De Haas | G05F 1/56 307/9.1 |
| 2014/0225110 A1* | 8/2014 | Nayak | H01L 22/14 257/48 |
| 2014/0246493 A1* | 9/2014 | Agrawal | G06K 7/10237 235/439 |
| 2015/0004909 A1* | 1/2015 | Agrawal | H02M 7/217 455/41.1 |

* cited by examiner

POWER HARVEST ARCHITECTURE FOR NEAR FIELD COMMUNICATION DEVICES

TECHNICAL FIELD

Embodiments of the disclosure relate to near field communication (NFC) devices and more particularly to an improved power harvest architecture for NFC devices.

BACKGROUND

NFC is a 13.56 MHz carrier based secure communication technology which is used in personal ID, money transaction etc. It is to be noted that NFC communication technology works on the same principle as RF communication technology. Hence, the NFC devices (readers/tags) can interchangeably interact with RF devices (readers/tags). An NFC system includes an NFC tag that contains information and an NFC reader that reads information from the NFC tag. An NFC tag can be an active NFC tag or a passive NFC tag. An active NFC tag generates its own magnetic field to interact with an NFC reader. The passive NFC tag utilizes the magnetic field or radio frequency (RF) field generated by an NFC reader for operation.

When the magnetic field of the NFC reader is incident on the antenna of the passive NFC tag, the tag harvests its power from incident magnetic field. The harvested power is used as a supply to analog modules, digital modules and memory circuits. There are many problems associated with the existing power harvest architectures in passive NFC devices. If power drawn by the passive NFC tag for charging is higher than that could be provided by the NFC reader, the huge inrush current results in overloading of the NFC reader, thus resulting in dV/V violation. Also, the passive tag works without any timing signal which results in inaccurate wakeup sequences. Sometimes, the presence of insufficient field causes false activation of the passive NFC tag and thus results in potential latch-up.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a method of charging a power harvested supply in an NFC (near field communication) device. An RF (radio frequency) field is received at the antenna of the NFC device. A differential voltage is generated from the RF field at a first tag pin and a second tag pin of the NFC device. A bandgap reference voltage and a reference current are generated in response to the differential voltage. A shunt current is generated in response to the differential voltage and the bandgap reference voltage. A bank of switching devices is activated if the shunt current is more than the reference current.

Another example embodiment provides an electronic communication device. The electronic communication device includes an antenna that receives a radio frequency (RF) field and generates a differential voltage at a first tag pin and a second tag pin of the electronic communication device from the RF field. A voltage reference system is coupled to the first tag pin and the second tag pin. The voltage reference system generates a bandgap reference voltage and a reference current responsive to the differential voltage. A shunt regulator is coupled to the first tag pin and the second tag pin and generates a shunt current responsive to the differential voltage and the bandgap reference voltage. A field detection circuit is coupled to the first tag pin and the second tag pin and compares the shunt current and the reference current. A logic unit is coupled to the field detection circuit. The logic unit activates a bank of switching devices if shunt current is more than the reference current.

An example embodiment provides a computing device. The computing device includes a processing unit, a memory module and an electronic communication device. The electronic communication device further includes an antenna that receives a radio frequency (RF) field and generates a differential voltage at a first tag pin and a second tag pin of the electronic communication device from the RF field. A voltage reference system is coupled to the first tag pin and the second tag pin. The voltage reference system generates a bandgap reference voltage and a reference current responsive to the differential voltage. A shunt regulator is coupled to the first tag pin and the second tag pin and generates a shunt current responsive to the differential voltage and the bandgap reference voltage. A field detection circuit is coupled to the first tag pin and the second tag pin and compares the shunt current and the reference current. A logic unit is coupled to the field detection circuit. The logic unit activates a bank of switching devices if shunt current is more than the reference current.

Other aspects and example embodiments are provided in the Drawings and the Detailed Description that follows.

DETAILED DESCRIPTION OF THE EMBODIMENTS

Figure 1:
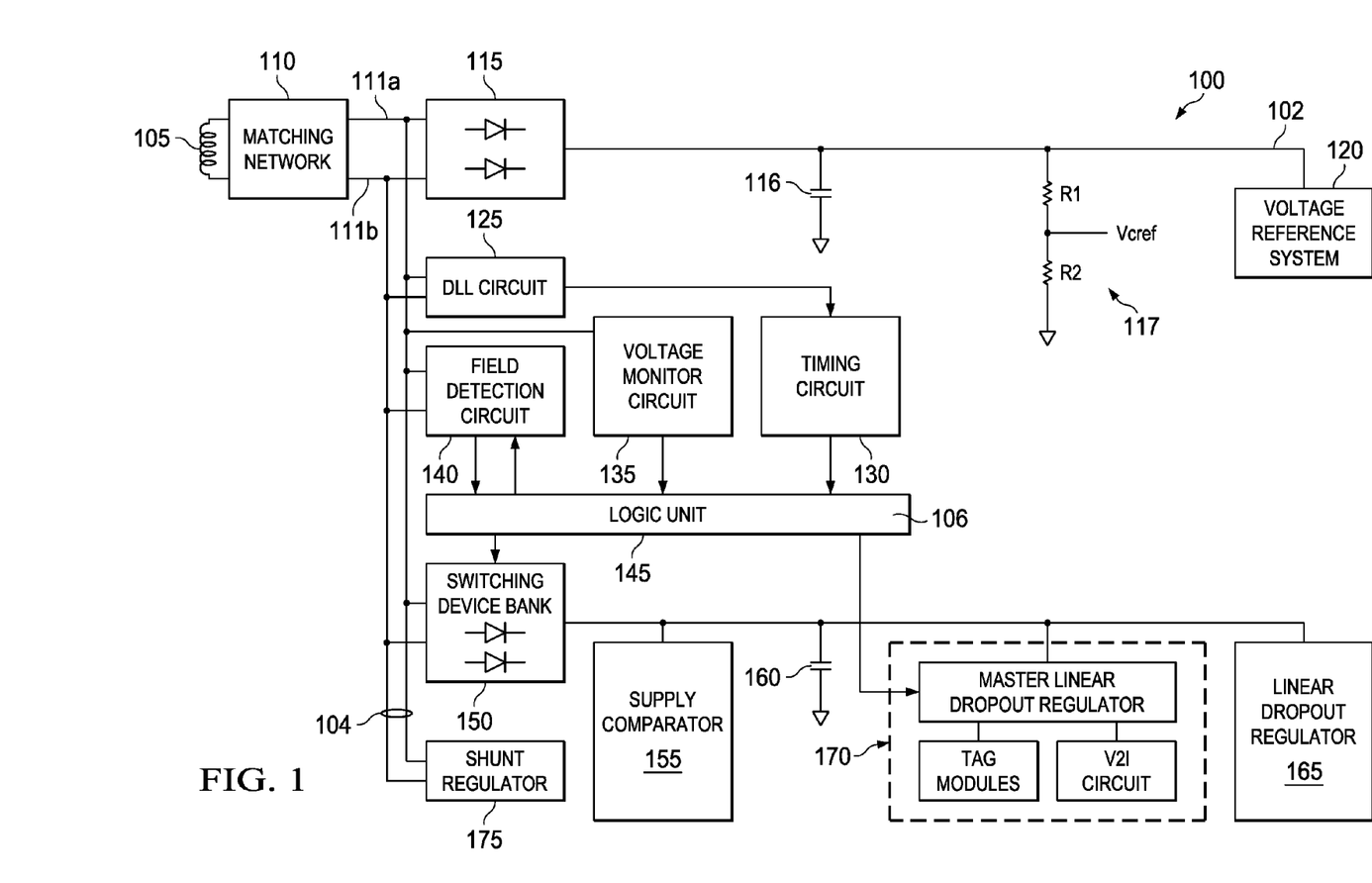
FIG. 1 illustrates a schematic of an electronic communication device according to an embodiment.

FIG. 1 illustrates a schematic of an electronic communication device 100 according to an embodiment. The electronic communication device 100 is one of RF (radio frequency) device, NFC (near field communication) device or any field communication device. The electronic communication device 100 includes an antenna 105. The antenna 105 is coupled to a matching network 110 which is further coupled to a first tag pin 111a and a second tag pin 111b (differential tag pins 111a and 111b). A half wave rectifier 115 is coupled to the differential tag pins 111a and 111b. A capacitor 116, a voltage divider circuit 117 and a voltage reference system 120 are coupled to the half wave rectifier 115. The voltage divider circuit 117 includes resistor R1 and resistor R2. One end of resistor R2 is coupled to ground. A DLL (Digital locked loop) circuit 125 is coupled to the differential tag pins 111a and 111b. A timing circuit 130 is coupled to the DLL circuit 125. A voltage monitor circuit 135 is coupled to the first tag pin 111a. In one of the embodiments, the voltage monitor circuit 135 is coupled to the second tag pin 111b. A field detection circuit 140 is coupled to the differential tag pins 111a and 111b. The field detection circuit 140 is bidirectionally coupled to a logic unit 145. The voltage monitor 135 and the timing circuit 130 are also coupled to the logic unit 145. A switching device bank 150 is coupled to the differential tag pins 111a and 111b. The logic unit 145 provides signal to the switching device bank 150. The switching device bank 150 includes a plurality of banks of switching devices. Each bank of switching devices includes one or more switching devices. The switching devices are one of the following, but not limited to, diodes, transistors and the like. The switching device bank 150 is coupled to a supply comparator 155, a capacitor 160, an analog module 170 and a linear dropout regulator (LDO) 165. The capacitor 160 serves as a power harvested supply. The analog module 170 includes the following components, but not limited to, Master linear dropout regulator (MLDO), Tag modules, voltage to current (V2I) circuit and the like.

The operation of the electronic communication device 100 illustrated in FIG. 1 is now explained. The antenna 105 receives a radio frequency (RF) signal/RF field from a neighboring device and generates a differential voltage at the differential tag pins 111a and 111b from the RF field. The neighboring device is one of RF device, NFC device, NFC reader or any field communication device. The matching network 110 is a passive network that is used for impedance matching between the antenna 105 and the differential tag pins 111a and 111b. The half wave rectifier 115 charges the capacitor 116. The capacitor 116 serves as a supply to the voltage divider circuit 117 and the voltage reference system 120. During initialization, when the electronic communication device 100 receives the RF field, the capacitor 116 is charged and a crude reference voltage (Vcref) is generated in between the resistors R1 and R2 at the voltage divider circuit 117. This Vcref is provided as a reference voltage Vref to the shunt regulator 175 initially till the voltage reference system 120 is activated. The shunt regulator 175 regulates the differential voltage generated at the differential tag pins 111a and 111b below a predefined upper threshold voltage. In one embodiment, the predefined upper threshold voltage for electronic communication device 100 is 1.8V. After a timed delay, the voltage reference system 120 is activated and generates a bandgap reference voltage and a reference current 102. The bandgap reference voltage is provided as the reference voltage Vref to the shunt regulator 175 to generate a shunt current 104 in response to the differential voltage. The bandgap reference voltage is more accurate than the crude reference voltage Vcref. Thus, the shunt regulator 175 utilizes the bandgap reference voltage to precisely regulate the differential voltage generated at the differential tag pins 111a and 111b below the predefined upper threshold voltage.

The voltage monitor circuit 135 periodically compares the voltage generated at the first tag pin 111a with a predefined lower threshold voltage. The voltage monitor circuit 135 sends a signal to the logic unit 145 to deactivate the electronic communication device 100 at any time during communication if the voltage generated at the first tag pin 111a is less than the predefined lower threshold voltage. Thus, the voltage monitor circuit 135 prevents false wake-up of the electronic communication device 100 when insufficient field is present at the differential tag pins 111a and 111b. The DLL circuit 125 generates a clock signal from the differential voltage generated at the differential tag pins 111a and 111b. The timing circuit 130 divides the clock signal generated by the DLL circuit 125 to generate the system clock. The system clock is provided to the logic unit 145. The system clock is used by the logic unit 145 for timed powering of different modules connected with the logic unit 145 such as the switching device bank 150, analog module 170 etc.

The field detection circuit 140 compares the shunt current 104 generated by the shunt regulator 175 and the reference current 102 generated by the voltage reference system 120. The comparison result of the field detection circuit 140 is provided to the logic unit 145. When shunt current 104 is more than the reference current 102, the logic unit 145 activates a bank of switching devices of the plurality of banks of switching devices. In one embodiment, the logic unit 145 activates a first bank of switching devices at a first clock cycle and a second bank of switching devices at a second clock cycle. The first bank of switching devices and the second bank of switching devices are part of the plurality of banks in switching device bank 150. The system clock from the timing circuit 130 provides the first clock cycle and the second clock cycle. In one embodiment, the first clock cycle and the second clock cycle are not consecutive clock cycles and are generated depending on requirement of electronic communication device 100. In one of the embodiments, when shunt current 104 is more than the reference current 102, the logic unit 145 activates a set of banks of switching devices at each clock cycle. In other embodiment, the logic unit 145 activates a set of switching devices in the switching device bank 150 at clock cycles generated from the system clock. Thus, when there is sufficient field is present at the differential tag pins 111a and 111b the switching devices in the switching device bank 150 are activated in a staggered manner. This prevents overloading of the neighboring device as only limited current is allowed to flow from the differential tag pins 111a and 111b to the capacitor 160. The voltage monitor circuit 135 periodically compares the voltage generated at the first tag pin with a predefined lower threshold voltage and deactivates the bank of switching devices if the voltage generated at the first tag pin is less than the predefined lower threshold voltage.

The activation of switching devices in the switching device bank 150 results in charging of capacitor 160. The capacitor 160 serves as a power harvested supply for the LDO 165 and the analog module 170. In one embodiment, the capacitor 160 also serves as a power harvested supply to other components of electronic communication device 100. The supply comparator 155 compares if the power harvested supply i.e. the capacitor 160 is charged above a predefined threshold. The LDO 165 is enabled if the power harvested supply is charged above a predefined threshold. After a timed delay, the logic unit 145 loads a set of Efuse bits 106 in the voltage reference system 120. The set of Efuse bits 106 are embedded in the electronic communication device 100. The voltage reference system 120 generates a trimmed reference current on receiving the set of Efuse bits 106. Trimmed reference current is more accurate than the reference current. The logic unit 145 provides a signal to the field detection circuit 140 to compare the trimmed reference current from the voltage reference system 120 and the shunt current 104 from the shunt regulator 175. The logic unit 145 activates the analog module 170 if the shunt current 104 is more than the trimmed reference current. After activation of analog module, the voltage monitor circuit 135 compares the voltage at the first tag pin 111a with the predefined lower threshold voltage to avoid latch-up because of insufficient field. The voltage monitor circuit 135 deactivates the bank of switching devices, if the voltage generated at the first tag pin is less than the predefined lower threshold voltage. The logic unit 145 activates a subsequent bank of switching devices in the switching device bank 150 if the voltage monitor circuit 135 indicates that the voltage at the first tag pin 111*a* is more than the predefined lower threshold voltage. In one embodiment, the logic unit 145 activates a set of switching devices if the voltage monitor circuit 135 indicates that the voltage at the first tag pin 111*a* is more than the predefined lower threshold voltage. In one embodiment, activation of switching devices, LDO and analog module are independent of each other. The specifically disclosed operations and sequences of activation are provided to explain the logical flow of methods and are understood not to limit the scope of the present disclosure.

Figure 2:
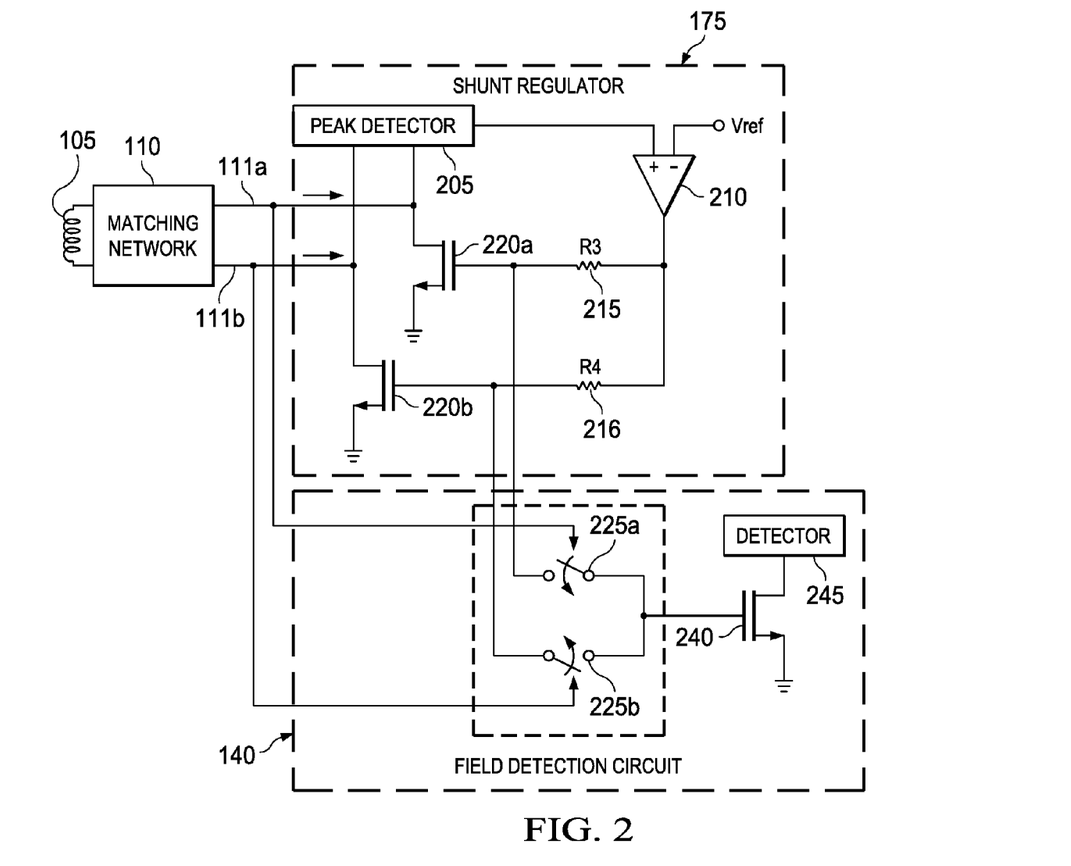
FIG. 2 illustrates a schematic of the shunt regulator and field detection circuit illustrated in FIG. 1, according to an embodiment.

FIG. 2 illustrates a schematic of the shunt regulator 175 and the field detection circuit 140 illustrated in FIG. 1, according to an embodiment. The antenna 105 is coupled to a matching network 110 which is further coupled to a first tag pin 111*a* and a second tag pin 111*b* (differential tag pins 111*a* and 111*b*). The shunt regulator 175 and the field detection circuit 140 are coupled to differential tag pins 111*a* and 111*b*. The shunt regulator 175 includes a peak detector 205 which receives signal from the differential tag pins 111*a* and 111*b*. A shunt amplifier 210 receives the reference voltage Vref and an output of the peak detector 205. An output of shunt amplifier 210 is connected to a gate terminal of a first NMOS transistor 220*a* through resistor R3 215 and a gate terminal of a second NMOS transistor 220*b* through resistor R4 216. In one embodiment, a plurality of shunt NMOS transistors receives output of shunt amplifier 210. The shunt NMOS transistors 220*a* and 220*b* are coupled to the differential tag pins 111*a* and 111*b*. In one embodiment, the plurality of shunt NMOS transistors 220*a* and 220*b* are any of regulating devices known in the art. One terminal of the shunt NMOS transistors 220*a* and 220*b* is connected to the ground terminal. The output of the shunt amplifier 210 is also provided to the field detection circuit 140 at switches 225*a* and 225*b*. The signal from the differential tag pins 111*a* and 111*b* control the functioning of switches 225*a* and 225*b* respectively. The switches 225*a* and 225*b* are coupled to a gate terminal of a shunt NMOS transistor 240. A detector 245 is coupled to the shunt NMOS transistor 240.

The operation of the shunt regulator 175 in conjunction with the field detection circuit 140 illustrated in FIG. 2 is now explained. The antenna 105 receives a radio frequency (RF) signal/RF field from a neighboring device and generates a differential voltage at the differential tag pins 111*a* and 111*b* from the RF field. The neighboring device is one of RF device, NFC device or any field communication device. The matching network 110 is a passive network that is used for impedance matching between the antenna 105 and the differential tag pins 111*a* and 111*b*. The shunt regulator 175 provides overvoltage protection to the electronic communication device 100. The peak detector 205 is coupled to the differential tag pins 111*a* and 111*b* and detects the peak voltage of the RF signal. The shunt amplifier 210 receives the peak voltage signal from the peak detector 205. The shunt amplifier 210 compares the peak voltage signal with the reference voltage Vref. Vref is equivalent to Vcref initially till the voltage reference system 120 is activated (as explained with reference to FIG. 1). Thereafter, Vref is equivalent to bandgap reference voltage after activation of voltage reference system 120. The bandgap reference voltage is more accurate than the crude reference voltage Vcref. The shunt amplifier 210 output controls the resistance of the shunt NMOS transistors 220*a* and 220*b* by controlling the bias gate voltage of the shunt NMOS transistors 220*a* and 220*b*. The shunt regulator 175 regulates the peak voltage at the peak detector 205 within pre-defined limits. The current is sensed by the field detection circuit 140 by mirroring the current through the shunt NMOS 220*a* and 220*b* of the shunt regulator 175. The switch 225*a* is activated for one half of the cycle while switch 225*b* is activated for the other half of the cycle. Thus, there is always current present at shunt NMOS transistor 240 which is used for detecting the RF field strength. This dynamic matching technique reduces probability of false wake-up of electronic communication device 100 and hence improves sensitivity of the device.

The flowchart diagram that follows is generally set forth as logical flowchart diagram. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 3:
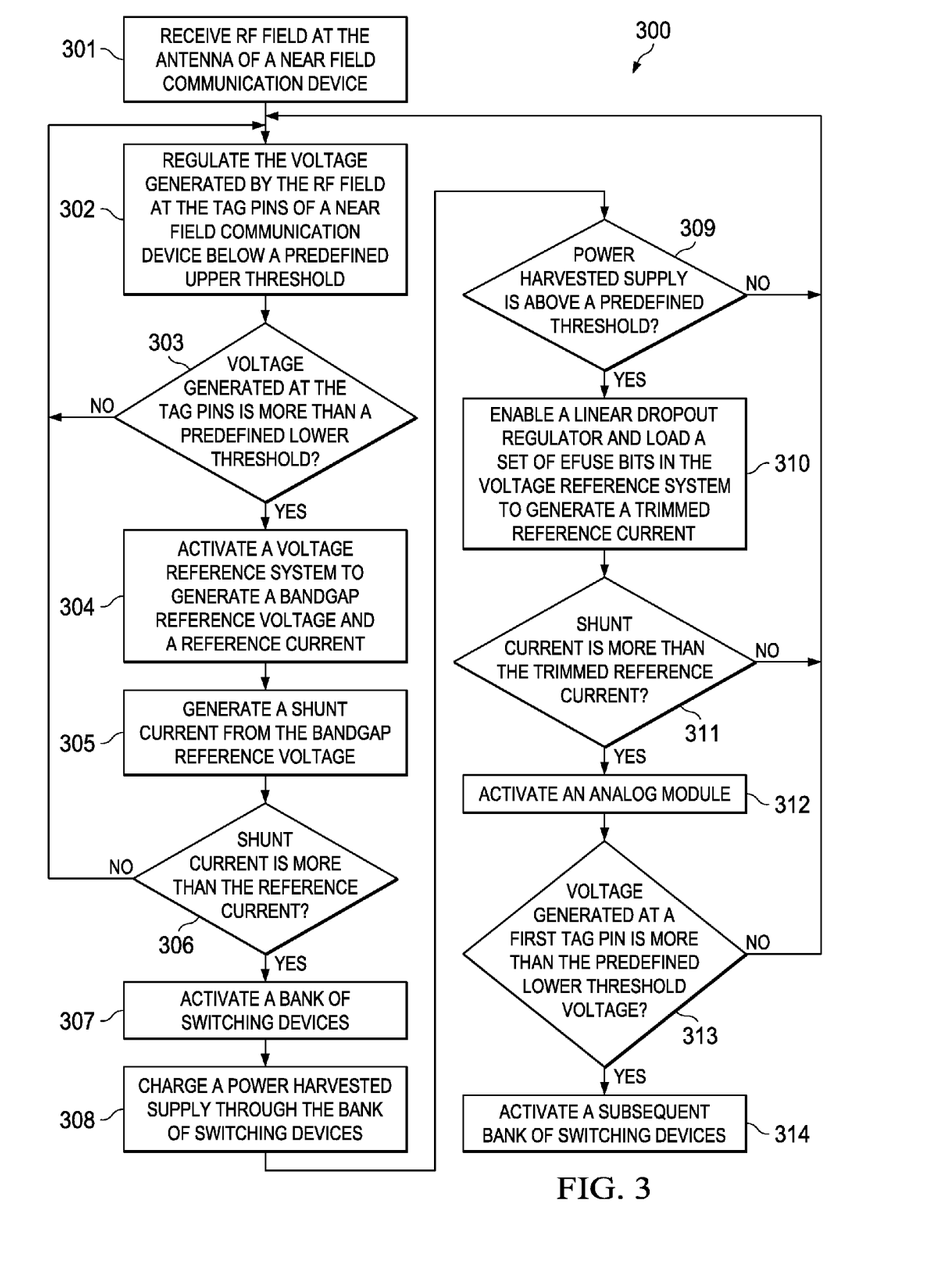
FIG. 3 is a flow diagram illustrating a method of charging a power harvested supply in an NFC device from an RF field without causing dV/V violation, according to an embodiment.

FIG. 3 is a flow diagram 300 illustrating a method of charging a power harvested supply in an NFC device from an RF field without causing dV/V violation, according to an embodiment. At step 301, RF signal/RF field is received at the antenna of an NFC device for example electronic communication device 100. The differential voltage generated by the RF signal/RF field at the differential tag pins is regulated below a predefined upper threshold at step 302. At step 303, the voltage generated at the tag pins of the electronic communication device 100 is compared with a predefined lower threshold voltage. If the voltage generated at the tag pins is more than the predefined lower threshold voltage, a voltage reference system 120 is activated to generate a bandgap reference voltage and a reference current (step 304). Otherwise, NFC device is deactivated and the system proceeds to the initial step 302. At step 305, a shunt current is generated from the bandgap reference voltage generated by the voltage reference system 120. At step 306, shunt current is compared with the reference current. If the shunt current is more than the reference current, the operation proceeds to step 307 otherwise the operation proceeds to the initial step 302. If the shunt current is more than the reference current, a bank of switching devices is activated, at step 307. At step 308, a power harvested supply is charged through the bank of switching devices. At step 309, the power harvested supply is compared with a predefined threshold. When the power harvested supply is charged above a predefined threshold, a linear dropout regulator (LDO) is enabled and a set of Efuse bits are loaded in the voltage reference system to generate a trimmed reference current (step 310). At step 311, shunt current is compared with the trimmed reference current. If the shunt current exceeds the trimmed reference current, an analog module is activated (step 312) else the system proceeds to the initial step 302. At step 313, if the voltage generated at the first tag pin is more than the predefined lower threshold voltage, a subsequent bank of switching devices is activated (step 314). In one embodiment, a set of switching devices is activated when the voltage generated at the first tag pin is more than the predefined lower threshold voltage.

Figure 4:
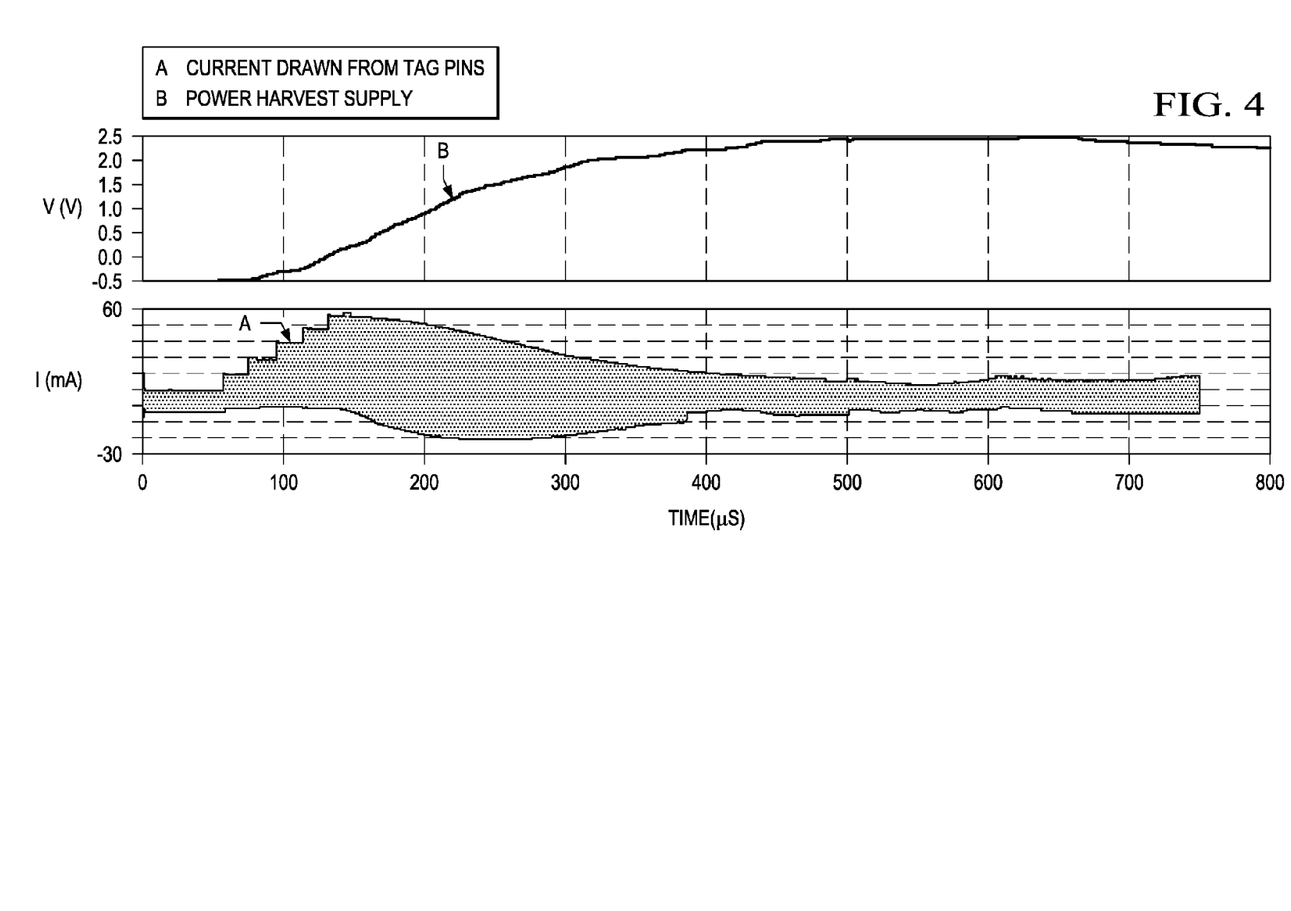
FIG. 4 illustrates a response of the electronic communication device 100 to the incident radio frequency (RF) signal/RF field, according to an example embodiment.

FIG. 4 illustrates the response of the electronic communication device 100 to the incident radio frequency (RF) signal/RF field, according to an example embodiment. The staggered power up of switching devices can be seen in response curve A. The staggered power up of switching devices reduces loading of the neighboring NFC device or NFC reader, as only limited amount of current is allowed from the differential tag pins 111a and 111b to the capacitor 160. As shunt current becomes more than the reference current, the banks of switching devices in the switching device bank 150 are activated at clock cycles generated by the timing circuit 130. Thus, increased current is drawn by the switching device bank in timed steps, as illustrated by response curve A. Curve B illustrates the ramping of power harvested supply due to the current pumped in the capacitor 160 as the banks of switching devices are activated. The current flowing to capacitor 160 shows an increase as the banks of switching devices are activated.

Figure 5:
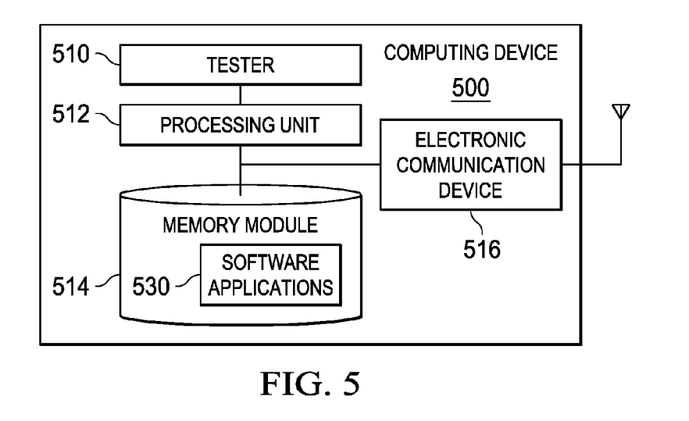
FIG. 5 illustrates a computing device with the electronic communication device illustrated in FIG. 1, according to an embodiment.

FIG. 5 illustrates a computing device according to an embodiment. The computing device 500 is, or is incorporated into, a mobile communication device, such as a mobile phone, a personal digital assistant, a personal computer, or any other type of electronic system. In some embodiments, the computing device 500 comprises a megacell or a system-on-chip (SoC) which includes control logic such as a processing unit 512 (e.g. Central Processing Unit), a memory module 514 (e.g., random access memory (RAM)) and a tester 510. The processing unit 512 can be, for example, a CISC-type (Complex Instruction Set Computer) CPU, RISC-type CPU (Reduced Instruction Set Computer), processor or a digital signal processor (DSP). The memory module 514 (which can be memory such as RAM, flash memory, or disk storage) is a memory module stores one or more software applications 530 (e.g., embedded applications) that, when executed by the processing unit 512, perform any suitable function associated with the computing device 500. The tester 510 comprises logic that supports testing and debugging of the computing device 500 executing the software application 530. For example, the tester 510 can be used to emulate a defective or unavailable component(s) of the computing device 500 to allow verification of how the component(s), were it actually present on the computing device 500, would perform in various situations (e.g., how the component(s) would interact with the software application 530). In this way, the software application 530 can be debugged in an environment which resembles post-production operation.

The processing unit 512 typically comprises memory and logic which store information frequently accessed from the memory module 514. The computing device 500 includes an electronic communication device 516 which is used for communication with neighboring field devices. The electronic communication device 516 is analogous to the electronic communication device 100 in connections and operation. The electronic communication device 516 has high sensitivity because the dynamic matching technique reduces probability of false wake-up of electronic communication device 516. Also, the electronic communication device generates clock signal from the incident RF signal which results in low cost and area. Thus, a crystal oscillator and associated timing circuitry is not required in electronic communication device 516 to generate clock signal. In addition, the staggered activation of switching devices in electronic communication device 516 prevents overloading of the neighboring NFC device (NFC reader) as only limited current is allowed to flow from the tag pins 111a and 111b to the capacitor 160. Thus, the power harvested supply in electronic communication device 516 is charged without causing dV/V violation.

In the foregoing discussion, the terms "connected" means at least either a direct electrical connection between the devices connected or an indirect connection through one or more passive intermediary devices. The term "circuit" means at least either a single component or a multiplicity of passive components, that are connected together to provide a desired function. The term "signal" means at least one current, voltage, charge, data, or other signal. Also, the terms "coupled to" or "couples with" (and the like) are intended to describe either an indirect or direct electrical connection. Thus, if a first device is coupled to a second device, that connection can be through a direct electrical connection, or through an indirect electrical connection via other devices and connections. The term "on" applied to a transistor or group of transistors is generally intended to describe gate biasing to enable current flow through the transistor or transistors.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following claims.

What is claimed is:

1. A method of charging a power harvested supply in an electronic communication device comprising:
    receiving an RF (radio frequency) field at an antenna of the electronic communication device;
    generating a differential voltage from the RF field at a first tag pin and a second tag pin of the electronic communication device;
    generating a bandgap reference voltage and a reference current in response to the differential voltage by a voltage reference system;
    generating a shunt current in response to the differential voltage and the bandgap reference voltage;
    activating a bank of switching devices if the shunt current is more than the reference current; and
    loading a set of Efuse bits in the voltage reference system to generate a trimmed reference current.

2. The method of claim 1 further comprising regulating the differential voltage generated from the RF field at the first tag pin and the second tag pin of the electronic communication device below a predefined upper threshold voltage.

3. The method of claim 1 further comprising periodically comparing voltage generated at the first tag pin with a predefined lower threshold voltage and deactivating the bank of switching devices if the voltage generated at the first tag pin is less than the predefined lower threshold voltage.

4. The method of claim 1 further comprising:
    enabling a linear dropout regulator (LDO) if power harvested supply is charged above a predefined threshold, wherein the set of Efuse bits are loaded in the voltage reference system after enabling the LDO;
    activating an analog module if the shunt current is more than the trimmed reference current;

comparing the voltage generated at the first tag pin with the predefined lower threshold voltage after activation of the analog module; and deactivating the bank of switching devices, if the voltage generated at the first tag pin is less than the predefined lower threshold voltage to avoid latch-up.

5. The method of claim 4 further comprising activating a subsequent bank of switching devices if the voltage generated at the first tag pin is more than the predefined lower threshold voltage after activation of the analog module.

6. The method of claim 1 further comprising generating a clock signal from the RF field by a digital locked loop (DLL) circuit, and dividing the clock signal to generate a system clock, wherein the DLL is coupled to the first tag pin and the second tag pin.

7. An electronic communication device comprising:
an antenna configured to receive a radio frequency (RF) field and generate a differential voltage at a first tag pin and a second tag pin from the RF field;
a voltage reference system coupled to the first tag pin and the second tag pin and configured to generate a bandgap reference voltage and a reference current responsive to the differential voltage;
a shunt regulator coupled to the first tag pin and the second tag pin and configured to generate a shunt current responsive to the differential voltage and the bandgap reference voltage;
a field detection circuit coupled to the first tag pin and the second tag pin and configured to compare the shunt current and the reference current; and
a logic unit coupled to the field detection circuit and configured to activate a bank of switching devices if shunt current is more than the reference current, wherein a set of Efuse bits are loaded in the voltage reference system to generate a trimmed reference current.

8. The electronic communication device of claim 7 is one of a Radio frequency (RF) device, a Near field communication (NFC) device and a field communication device.

9. The electronic communication device of claim 7, wherein the shunt regulator is configured to regulate the differential voltage generated from the RF field at the first tag pin and the second tag pin below a predefined upper threshold voltage.

10. The electronic communication device of claim 7 further comprising a voltage monitor circuit coupled to the first tag pin, wherein the voltage monitor circuit provides a signal to the logic unit to deactivate the bank of switching devices if voltage generated at the first tag pin is less than a predefined lower threshold voltage.

11. The electronic communication device of claim 7, wherein the shunt regulator comprises:
a peak detector configured to receive the differential voltage and generate a peak voltage signal;
a shunt amplifier configured to compare the peak voltage signal with the bandgap reference voltage; and
a first NMOS transistor coupled to the first tag pin and a second NMOS transistor coupled to the second tag pin, wherein a gate terminal of the first NMOS transistor and a gate terminal of the second NMOS transistor are configured to receive output of the shunt amplifier.

12. The electronic communication device of claim 7, wherein the field detection circuit, comprises:
a first switch and a second switch connected in parallel, wherein the first switch and the second switch are controlled by the differential voltage at the first tag pin and the second tag pin respectively; and a gate terminal of a third NMOS transistor configured to receive output of the shunt amplifier through the first switch and the second switch, whereby the field detection circuit detects the RF field at all values of RF field and avoids false wakeup of NFC device through mirroring current from the shunt regulator.

13. The electronic communication device of claim 7 further comprising a power harvested supply charged through the bank of switching devices, wherein the bank of switching devices are coupled to the first tag pin and the second tag pin.

14. The electronic communication device of claim 13 further comprising a linear dropout regulator (LDO) coupled to the bank of switching devices, wherein the LDO is activated if the power harvested supply is charged above a predefined threshold.

15. The electronic communication device of claim 14, wherein the set of Efuse bits are embedded in the electronic communication device, and wherein the set of Efuse bits are loaded in the voltage reference system after activating the LDO.

16. The electronic communication device of claim 15 further comprising an analog module that is activated if the shunt current is more than the trimmed reference current.

17. The electronic communication device of claim 7 further comprising a digital locked loop (DLL) circuit coupled to the first tag pin and the second tag pin and a timing circuit coupled to the DLL circuit, wherein the DLL circuit is configured to generate a clock signal from the differential voltage and the timing circuit is configured to divide the clock signal to generate a system clock.

18. A computing device comprising:
a processing unit;
a memory module coupled to the processing unit;
an electronic communication device coupled to the processing unit and the memory module, wherein the electronic communication device further comprises:
an antenna configured to receive a radio frequency (RF) field and generate a differential voltage at a first tag pin and a second tag pin from the RF field;
a voltage reference system coupled to the first tag pin and the second tag pin and configured to generate a bandgap reference voltage and a reference current responsive to the differential voltage;
a shunt regulator coupled to the first tag pin and the second tag pin and configured to generate a shunt current responsive to the differential voltage and the bandgap reference voltage;
a field detection circuit coupled to the first tag pin and the second tag pin and configured to compare the shunt current and the reference current; and
a logic unit coupled to the field detection circuit and configured to activate a bank of switching devices if shunt current is more than the reference current, wherein a set of Efuse bits are loaded in the voltage reference system to generate a trimmed reference current.

19. The computing device of claim 18, wherein the electronic communication device further comprises:
a digital locked loop (DLL) circuit coupled to the first tag pin and the second tag pin and configured to generate a clock signal from the differential voltage; and
a timing circuit coupled to the DLL circuit and configured to divide the clock signal to generate a system clock, wherein the logic unit is coupled to the timing circuit.

20. The computing device of claim 18, wherein the electronic communication device further comprises:

a power harvested supply charged through the bank of switching devices, wherein the bank of switching devices is coupled to the first tag pin and the second tag pin;

a linear dropout regulator (LDO), wherein the LDO is activated if the power harvested supply is more than a predefined threshold, wherein the set of Efuse bits are embedded in the electronic communication device, and wherein the set of Efuse bits are loaded in the voltage reference system after activating the LDO; and an analog module that is activated if the shunt current is more than the trimmed reference current.

* * * * *